(12) United States Patent
Cho et al.

(10) Patent No.: US 10,048,430 B2
(45) Date of Patent: Aug. 14, 2018

(54) LIQUID CRYSTAL DISPLAY COMPRISING ABSORPTION DYES

(71) Applicant: SKC HI-TECH & MARKETING CO., LTD., Chungcheongnam-do (KR)

(72) Inventors: Hong Youl Cho, Chungcheongnam-do (KR); Kyoo Choong Cho, Gyeonggi-do (KR); Yong Jae Choe, Gyeonggi-do (KR); Hyun Cheol Nam, Chungcheongnam-do (KR)

(73) Assignee: SKC HI-TECH & MARKETING CO., LTD., Chungcheongnam-Do (KR)

( * ) Notice: Subject to any disclaimer, the term of this patent is extended or adjusted under 35 U.S.C. 154(b) by 0 days.

(21) Appl. No.: 15/474,891

(22) Filed: Mar. 30, 2017

(65) Prior Publication Data

US 2017/0285248 A1 Oct. 5, 2017

(30) Foreign Application Priority Data

Apr. 1, 2016 (KR) .................. 10-2016-0039984

(51) Int. Cl.
  *G02F 1/1335* (2006.01)
  *F21V 8/00* (2006.01)

(52) U.S. Cl.
  CPC ......... *G02B 6/0056* (2013.01); *G02B 6/0051* (2013.01); *G02B 6/0053* (2013.01); *G02B 6/0055* (2013.01); *G02B 6/0063* (2013.01); *G02F 1/133528* (2013.01); *G02F 1/133617* (2013.01); *G02F 1/133536* (2013.01); *G02F 2001/133507* (2013.01); *G02F 2001/133614* (2013.01); *G02F 2202/04* (2013.01); *G02F 2202/28* (2013.01)

(58) Field of Classification Search
  CPC ................. G02F 1/133528; G02F 1/133536
  See application file for complete search history.

(56) References Cited

U.S. PATENT DOCUMENTS

| | | | |
|---|---|---|---|
| 2007/0275184 A1 | 11/2007 | Lee et al. | 428/1.3 |
| 2008/0043177 A1 | 2/2008 | Ito | 349/98 |
| 2009/0303589 A1 | 12/2009 | Lee et al. | 359/487 |
| 2012/0075568 A1 | 3/2012 | Chang et al. | 349/194 |
| 2014/0087201 A1 | 3/2014 | Mochizuki et al. | 428/523 |

(Continued)

FOREIGN PATENT DOCUMENTS

| | | | | |
|---|---|---|---|---|
| JP | 2006-154281 A | 6/2006 | ............ | G02F 1/335 |
| JP | 2008-225225 | 9/2008 | ............ | G02B 5/30 |

(Continued)

OTHER PUBLICATIONS

Office Action dated Dec. 5, 2017, issued in the corresponding Japanese Patent Application No. 2017-012275.

(Continued)

*Primary Examiner* — Phu Vu
(74) *Attorney, Agent, or Firm* — Harness, Dickey & Pierce, P.L.C.

(57) ABSTRACT

The present invention relates to a liquid crystal display comprising an absorption dye, wherein the liquid crystal display of the present invention may enhance color gamut and brightness by transmitting pure red, green, and blue (RGB) wavelengths emitted from a light source as much as possible and absorbing unnecessary wavelengths other than the RGB wavelengths.

14 Claims, 10 Drawing Sheets

(56) References Cited

U.S. PATENT DOCUMENTS

| | | | |
|---|---|---|---|
| 2015/0378077 A1 | 12/2015 | Haag et al. | G02B 5/3041 |
| 2016/0306086 A1* | 10/2016 | Haag | G02B 5/3041 |
| 2017/0017120 A1* | 1/2017 | Choi | G02F 1/133621 |

FOREIGN PATENT DOCUMENTS

| | | | |
|---|---|---|---|
| JP | 2009-522601 | 6/2009 | G02B 5/02 |
| JP | 2010-134349 | 6/2010 | G02F 1/1335 |
| JP | 2013-532845 A | 8/2013 | G02B 5/30 |
| KR | 1019970700585 | 2/1997 | |
| TW | 201344260 A | 11/2013 | G02B 5/30 |
| TW | 201439611 A | 10/2014 | G02B 5/30 |
| WO | WO-1995017303 A1 | 6/1995 | |
| WO | 2013/141236 A1 | 9/2013 | G02B 5/30 |
| WO | WO 2015/098906 | 7/2015 | G02B 5/30 |

OTHER PUBLICATIONS

Jan. 21, 2018 Taiwan Office Action from corresponding Taiwan Patent Application No. 106100824 dated May 31, 2017.

* cited by examiner

LIQUID CRYSTAL DISPLAY COMPRISING ABSORPTION DYES

CROSS REFERENCES TO RELATED APPLICATIONS

The present application claims benefit of and priority to Korean Patent Application No. 10-2016-0039984, filed in the Korean Patent Office on Apr. 1, 2016, the entire contents of which are incorporated herein by reference.

FIELD

The present disclosure relates to a liquid crystal display in which enhancements of brightness and color gamut are maximized by comprising an absorption dye in a reflective polarizing film.

BACKGROUND

In the past, 40-inch (") class TVs were prevalent, but many consumers now purchase 50" class TVs and even 60" class TVs. While the size competition was over, resolution competition has begun. Even a year ago, full high definition (FHD) class TVs belonged to an advanced model, but ultra HD (UHD) TVs now have been rapidly spread on the market.

Recently, the display market has evolved from large-area, high-resolution competition to color competition. For this reason, competition for the production of a display with excellent color has recently emerged.

A liquid crystal display (LCD) displays an image by using optical properties of liquid crystals, wherein, since a liquid crystal panel displaying the image is a non-emissive device or not self-luminous, the liquid crystal display has a structure comprising the liquid crystal panel as well as a backlight unit which is disposed on a rear surface of the liquid crystal panel to provide light to the liquid crystal panel.

Since the liquid crystal display does not entirely transmit light provided by the back-light unit, brightness of the panel is very important. Various films have been developed and used to improve the brightness of the panel, and a typical example of the film comprises a reflective polarizing film.

The reflective polarizing film is typically in the form of a multilayer film in which a layer having a low refractive index and a layer having a high refractive index are alternatingly stacked, and the multilayer film causes optical interference in which light with a specific wavelength is selectively reflected and/or transmitted by interlayer interference. It is known that, when tens to hundreds or more of layers are sufficiently stacked as described above and a thickness of the adjacent layer is gradually changed, reflection and/or polarization characteristics in a desired wavelength range may be improved (see Korean Patent Application Laid-open Publication No. 1997-0700585 and International Patent Application WO 1995-017303).

However, under the circumstances that a picture quality standard has been changed for UHD broadcast, the application of the reflective polarizing film may provide an improvement in terms of brightness, but there is a need for a separate solution in terms of color gamut. Particularly, there is a need to develop a new technique which may dramatically improve a color gamut to a UHD broadcast standard, as a new standard level, while minimizing brightness loss.

SUMMARY

Technical Problem

An object of the present invention is to provide a liquid crystal display which may maximize brightness as well as an enhancement of color gamut of the liquid crystal display by transmitting pure red, green, and blue (RGB) wavelengths emitted from a light source as much as possible and blocking unnecessary wavelengths other than the RGB wavelengths.

Solution to Problem

To achieve the above objects, the present invention provides a liquid crystal display comprising:
a backlight unit; and a liquid crystal panel,
wherein the backlight unit sequentially comprises two or more of a reflective polarizing film, a prism sheet, a diffusion sheet, a light guide plate, and a reflective plate, and
the reflective polarizing film comprises an absorption dye which includes at least one of a hydroxy benzotriazole-based dye and a tetra aza porphyrin-based dye.

Advantageous Effects of Invention

According to the present invention, since an absorption dye including a hydroxy benzotriazole-based dye and a tetra aza porphyrin-based dye is introduced into a reflective polarizing film, a color gamut may be enhanced by transmitting pure red, green, and blue (RGB) wavelengths emitted from a light source as much as possible and blocking unnecessary wavelengths other than the RGB wavelengths, and thus, a liquid crystal display may be manufactured in which enhancements of brightness and color gamut are maximized.

DETAILED DESCRIPTION

A liquid crystal display of the present invention comprises a backlight unit and a liquid crystal panel, wherein the backlight unit sequentially comprises two or more of a reflective polarizing film, a prism sheet, a diffusion sheet, a light guide plate, and a reflective plate, and the reflective polarizing film comprises an absorption dye which includes at least one of a hydroxy benzotriazole-based dye and a tetra aza porphyrin-based dye.

Figure 1:
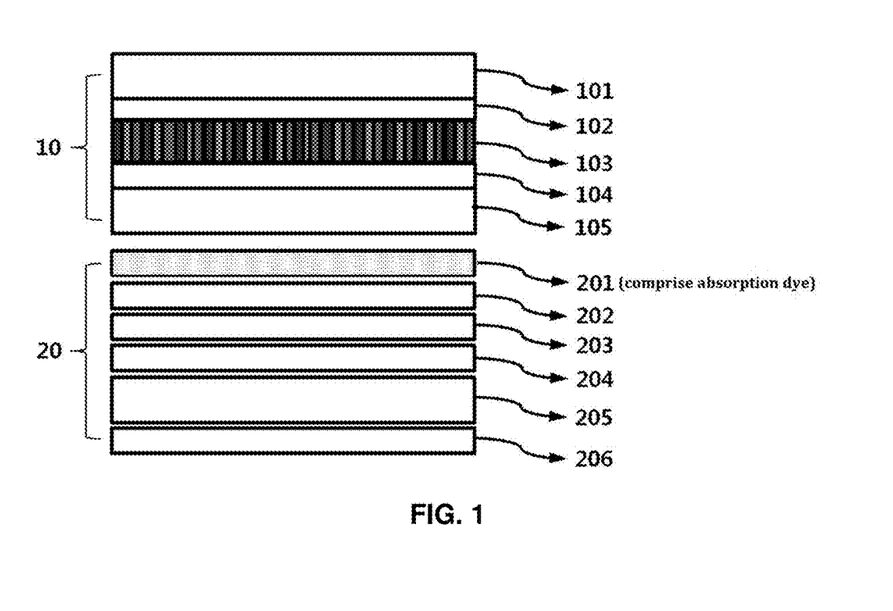
FIG. 1 is a schematic view illustrating a structure of a liquid crystal display according to an embodiment of the present invention.

A structure of a liquid crystal display according to an embodiment of the present invention is illustrated in FIG. 1.

Referring to FIG. 1, a liquid crystal panel 10 may comprise an upper polarizing plate 101, an adhesive layer I 102, a liquid crystal cell 103, an adhesive layer II 104, and a lower polarizing plate 105 in a sequentially stacked form, and a backlight unit 20 may comprise a reflective polarizing film 201, a horizontal prism sheet 202, a vertical prism sheet 203, a diffusion sheet 204, a light guide plate 205, and a reflective plate 206 in a sequentially stacked form.

Figure 2A:
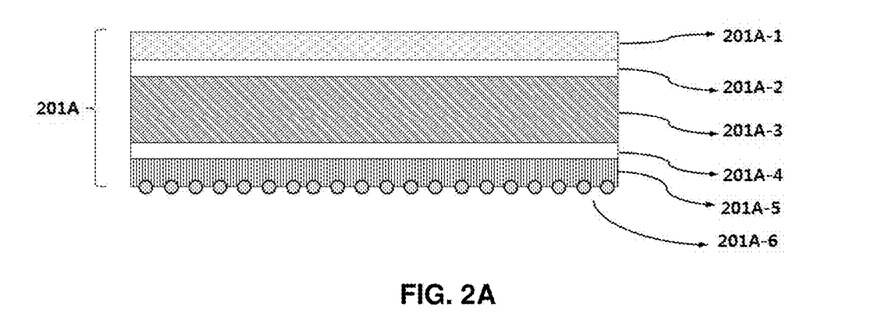
FIGS. 2A to 2E are schematic views respectively illustrating structures of reflective polarizing films (FIGS. 2A and B), a horizontal prism sheet (FIG. 2C), a diffusion sheet (FIG. 2D), and a reflective plate (FIG. 2E).
Figure 2B:
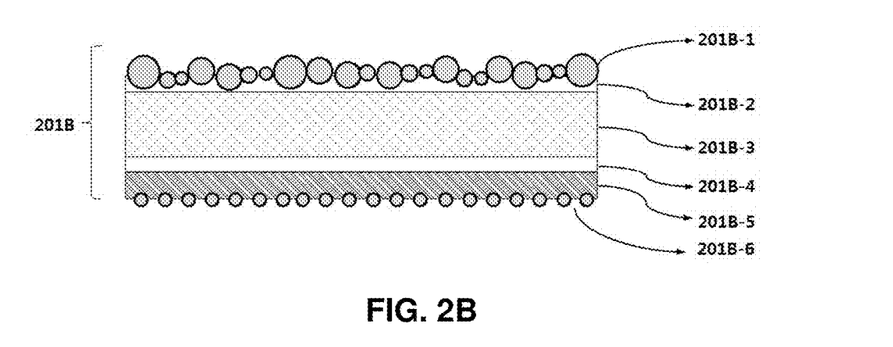
Figure 2C:
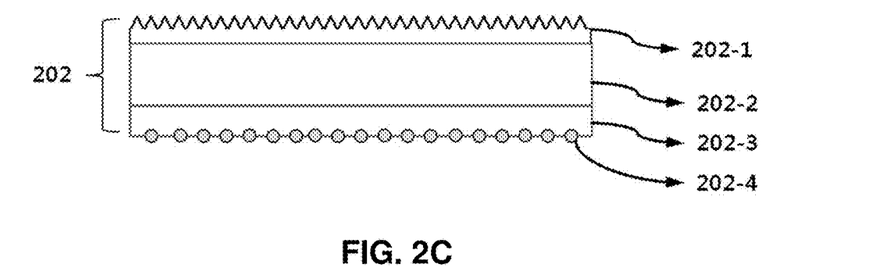
Figure 2D:
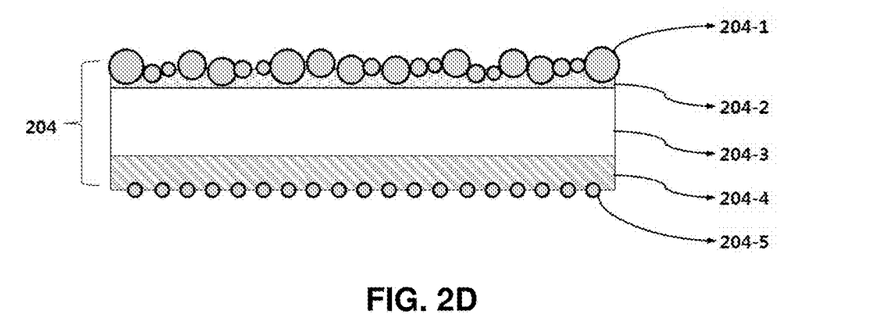
Figure 2E:
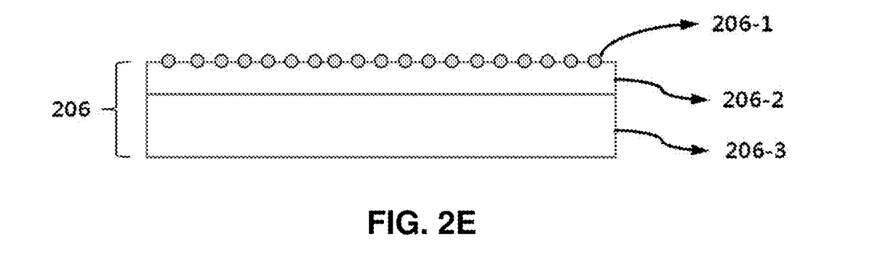

Referring to FIGS. 2A to 2E, a reflective polarizing film 201A of FIG. 2A may comprise a first polyester layer 201A-1, a first adhesive layer 201A-2, a core layer 201A-3, a second adhesive layer 201A-4, a second polyester layer 201A-5, and a rear bead layer 201A-6 in a sequentially stacked form. Also, a reflective polarizing film 201B of FIG. 2B may comprise a diffusion bead layer 201B-1, a diffusion coating layer 201B-2, a core layer 201B-3, an adhesive layer 201B-4, a polyester layer 201B-5, and a rear bead layer 201B-6 in a sequentially stacked form. In addition, the horizontal prism sheet 202 of FIG. 2C may comprise a prism pattern layer 202-1 on one side of a prism sheet base material 202-2 and may comprise a rear coating layer 202-3 having third beads 202-4 on an opposite side thereof. Also, the vertical prism sheet 203 may have the same layer configuration as the horizontal prism sheet 202. Furthermore, the diffusion sheet 204 of FIG. 2D may comprise a diffusion coating layer 204-2 having first beads 204-1 on one side of a diffusion sheet base material 204-3 and may comprise a concealing coating layer 204-4 having second beads 204-5 on an opposite side thereof. Also, the reflective plate 206 of FIG. 2E may comprise a front coating layer 206-2 having fourth beads 206-1 on one side of a reflective plate base material 206-3.

However, the liquid crystal display of the present invention is not limited to the above-described structure and may be variously modified if necessary.

When the basic principle of a liquid crystal display is examined, since brightness of light emitted from a light source is rapidly decreased due to diffusion of the light in a horizontal/vertical direction perpendicular to a side of a diffusion sheet while the light is guided in a direction of a liquid crystal panel through a light guide plate and then passes through the diffusion sheet, outgoing of the light from the diffusion sheet in a direction other than a front light exit surface is prevented by passing the light through a prism sheet and light directivity is improved to narrow a viewing angle, and thus, brightness in a direction of the front light exit surface of backlight is increased. Subsequently, since the light passed through the prism sheet (horizontal and/or vertical prism sheet) is allowed to pass through a reflective polarizing film, the increase in the brightness is maximized by light recycling.

According to the present invention, the backlight unit sequentially comprises two or more of a reflective polarizing film, a prism sheet, a diffusion sheet, a light guide plate, and a reflective plate, and the reflective polarizing film comprises an absorption dye which includes at least one of a hydroxy benzotriazole-based dye and a tetra aza porphyrin-based dye. That is, brightness loss may vary depending on a position of a layer including the absorption dye, wherein technical features of the present invention include that the layer including the absorption dye is positioned in the reflective polarizing film near the liquid crystal panel among component layers of the backlight unit.

According to an embodiment of the present invention, the reflective polarizing film may sequentially comprise the first polyester layer, the first adhesive layer, the core layer, the second adhesive layer, the second polyester layer, and the rear bead layer (structure of 201A in FIG. 2A), and may have a coating layer including the absorption dye on at least one position of one side or both sides of the first polyester layer, one side or both sides of the core layer, and one side or both sides of the second polyester layer, or may comprise the absorption dye in the first adhesive layer, the second adhesive layer, or both thereof.

According to another embodiment of the present invention, the reflective polarizing film may sequentially comprise the diffusion bead layer, the diffusion coating layer, the core layer, the adhesive layer, the polyester layer, and the rear bead layer (structure of 201B in FIG. 2B), and may have a coating layer including the absorption dye on at least one position of one side or both sides of the core layer and one side or both sides of the polyester layer, or may comprise the absorption dye in the diffusion coating layer, the adhesive layer, or both thereof.

For example, each of the coating layer and adhesive layer including the absorption dye may be formed by wet coating. Specifically, a thickness of each of the absorption dye-containing coating layer and adhesive layer may be in a range of 1 μm to 100 μm, 2 μm to 100 μm, 2 μm to 25 μm, or 2 μm to 15 μm.

The absorption dye-containing coating layer may comprise a binder resin, and the binder resin, for example, may comprise at least one resin selected from the group consisting of a polyester-based binder resin, an acryl-based binder resin, a polyurethane-based binder resin, a melamine-based binder resin, a polyvinyl alcohol-based binder resin, and an oxazoline-based binder resin. Specifically, the binder resin may be an acryl-based binder resin.

The absorption dye-containing adhesive layer may further comprise a pressure-sensitive adhesive. The pressure-sensitive adhesive, for example, may comprise at least one adhesive selected from the group consisting of an acryl-based adhesive, a urethane-based adhesive, an epoxy-based adhesive, and a silicon-based adhesive. Specifically, the pressure-sensitive adhesive may be an acryl-based adhesive.

Specifically, the absorption dye may be included in an amount of 0.01 wt % to 10 wt %, particularly 0.05 wt % to 7 wt %, based on the total weight of the absorption dye-containing coating layer or adhesive layer.

The polyester layer may comprise a polycarbonate film or a polyethylene terephthalate film. Specifically, the polyethylene terephthalate film may be uniaxially stretched or may have a controlled orientation angle.

The core layer may be a laminated film in which a first polymer layer and a second polymer layer having different refractive indices from each other are alternatingly stacked to selectively reflect and transmit a visible light having a specific wavelength. For example, the first polymer layer and the second polymer layer may be stacked to be directly in contact with each other or may be stacked to have additional polymer layers disposed there between. Specifically, the laminate may have 100 layers to 1,000 layers, for example, 300 layers to 500 layers.

The first polymer layer may be formed of polyester in which the refractive index is changed by stretching. Specifically, the first polymer layer may be a polyethylene terephthalate film or a polynaphthalene terephthalate film.

The second polymer layer may be formed of polyester in which a change in the refractive index by stretching is small. Specifically, the second polymer layer may be a copolymerized polynaphthalene terephthalate film. For example, the copolymerized polynaphthalene terephthalate may be formed by copolymerization of a dicarboxylic acid component including naphthalene dicarboxylic acid and dimethyl terephthalic acid with a glycol component including ethylene glycol.

Each of the first polymer layer and the second polymer layer may have a thickness of 0.05 μm to 0.5 μm, for example, 0.05 μm to 0.3 μm. The thickness of the first polymer layer and the second polymer layer may be continuously changed or may be changed stepwise.

The first polymer layer may be stretched in a uniaxial direction (x-axis direction) to have a high refractive index in the uniaxial stretching direction (x-axis direction), and, as a result, a difference in the refractive index from the second polymer layer in the stretching direction is increased. Thus, the core layer, which is formed by alternatingly stacking the first polymer layer and the second polymer layer, may have reflective characteristics with respect to first polarized light.

In contrast, since the difference in the refractive index between the first polymer layer and the second polymer layer does not occur in another axis direction (y-axis direction) perpendicular to the uniaxial stretching direction in a film plane, the core layer may have transmissive characteristics with respect to second polarized light.

The prism sheet may comprise the horizontal prism sheet, the vertical prism sheet, or a composite prism sheet as a combination thereof. Also, the prism sheet may be a sheet comprising a plurality of hemispherical microlenses.

The absorption dye includes at least one of a hydroxy benzotriazole-based dye and a tetra aza porphyrin-based dye, and may further include a dye absorbing a wavelength band of 480 nm to 510 nm or 560 nm to 610 nm. Specifically, the dye may be at least one selected from the group consisting of a cyanine-based dye, a pyrrole methine-based dye, a rhodamine-based dye, and a boron dipyrromethene-based dye. For example, the absorption dye may be a combination of the hydroxy benzotriazole-based dye, the cyanine-based dye, and the tetra aza porphyrin-based dye.

The liquid crystal panel may sequentially comprise the upper polarizing plate, the adhesive layer I, the liquid crystal cell, the adhesive layer II, and the lower polarizing plate.

The component layers of each of the backlight unit and the liquid crystal panel constituting the liquid crystal display of the present invention may have a material, a thickness, and a shape, which are commonly accepted in the art, and may be variously modified if necessary.

Thus, the liquid crystal display of the present invention, which comprises the reflective polarizing film including the absorption dye, may provide enhanced color gamut and brightness by blocking unnecessary wavelengths other than pure RGB wavelengths while transmitting the pure RGB wavelengths emitted from a light source as much as possible.

EXAMPLE

Hereinafter, the present invention is explained in more detail by Examples. The following Examples are intended to further illustrate the present invention without limiting its scope.

Example 1-1

25 wt % of an acryl binder resin (GS1000 manufactured by Soken) and 75 wt % of methyl ethyl ketone were mixed to prepare a solution, and an absorption dye (SK-d593 SK Chemicals, main absorption wavelength band: 560 nm to 610 nm) was then added thereto in an amount of 0.05 part by weight based on 100 parts by weight of the solution to prepare an absorption dye-containing coating layer composition.

One surface of a uniaxially stretched polyethylene terephthalate (PET) film (average thickness: 100 μm, orientation angle: 3°) was coated with the absorption dye-containing coating layer composition by using a mayer bar and dried and cured to form a 5 μm thick absorption dye-containing coating layer. Thereafter, a core layer was adhered to the other side of the uniaxially stretched PET film and a general PET film (manufacturer: SKC, product name: V5400) was adhered to the other side of the core layer. A reflective polarizing film (see FIG. 2A) was prepared by treating the other side of the general PET film by bead coating so that a haze of a rear bead layer became 35%, and the reflective polarizing film was applied into a backlight unit (BLU). The BLU had a structure in which the reflective polarizing film, a horizontal prism sheet, a vertical prism sheet, a diffusion sheet, a light guide plate, and a reflective plate were sequentially stacked.

Also, a liquid crystal display was manufactured by using a liquid crystal panel having a structure in which an upper polarizing plate, an adhesive layer I, a liquid crystal cell, an adhesive layer II, and a lower polarizing plate were sequentially stacked (see FIG. 1).

Example 1-2

A liquid crystal display was manufactured in the same manner as in Example 1-1 except that a reflective polarizing film (see FIG. 2B) having a structure, in which a diffusion bead layer, a diffusion coating layer, a core layer, an adhesive layer, a polyester layer (general PET film, manufacturer: SKC, product name: V5400), and a rear bead layer were sequentially stacked, was used, in which 15 parts by weight of beads (manufacturer: Sekisui, product name: MBX-40) based on 100 parts by weight of the solution was further added to the absorption dye-containing coating layer composition of Example 1-1 to prepare the diffusion coating layer (containing an absorption dye) and the diffusion bead layer.

Comparative Example 1

A liquid crystal display having the same structure as Example 1-1 was used except that an absorption dye was not added.

Experimental Example 1

Figure 3:
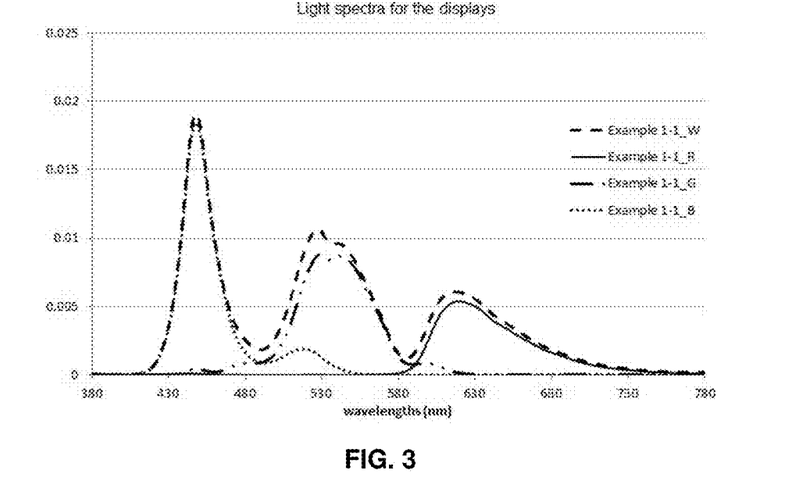
FIGS. 3 to 17 respectively illustrate emission spectra of liquid crystal displays of Examples 1-1 to 3-6 and Comparative Examples 1 and 2.
Figure 4:
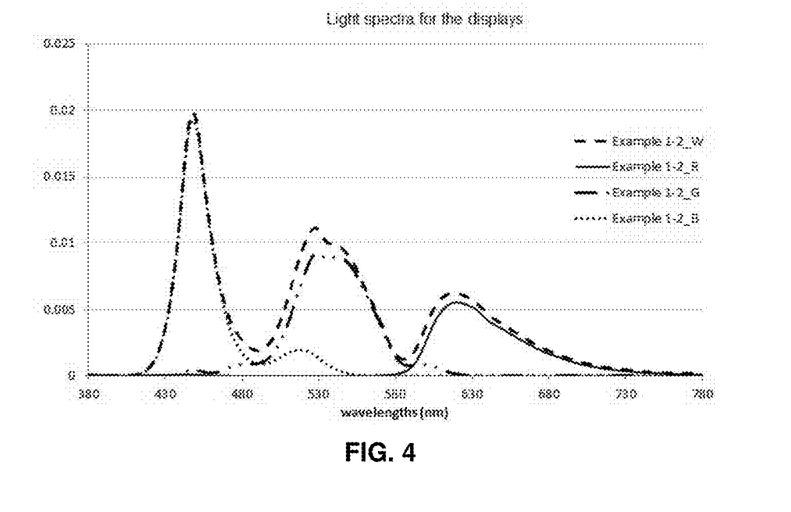
Figure 5:
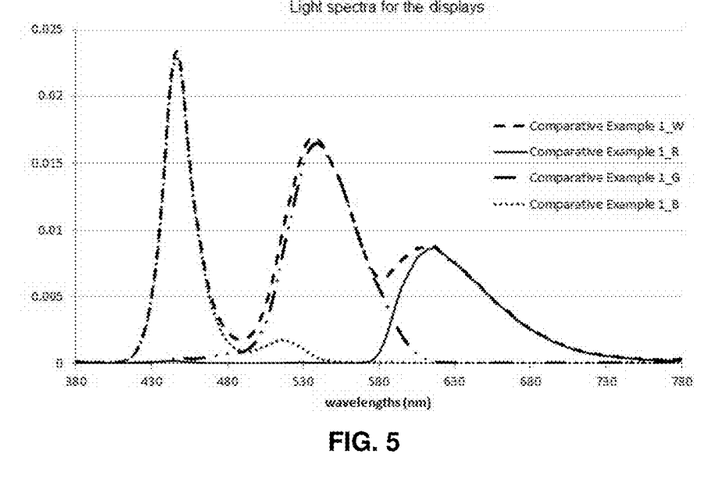
Figure 6:
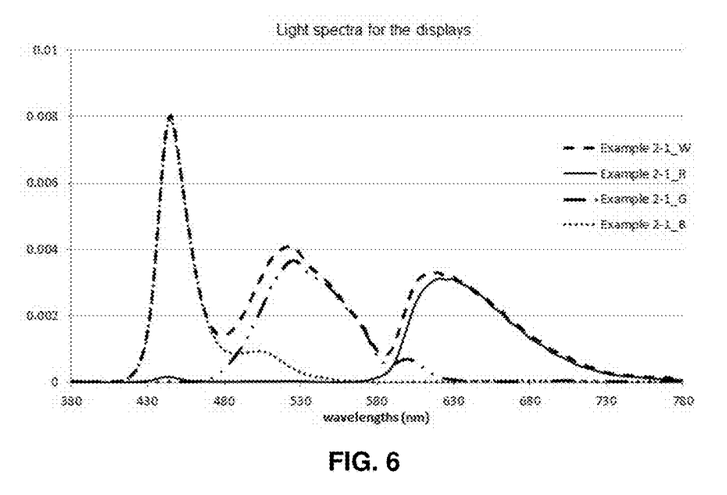
Figure 7:
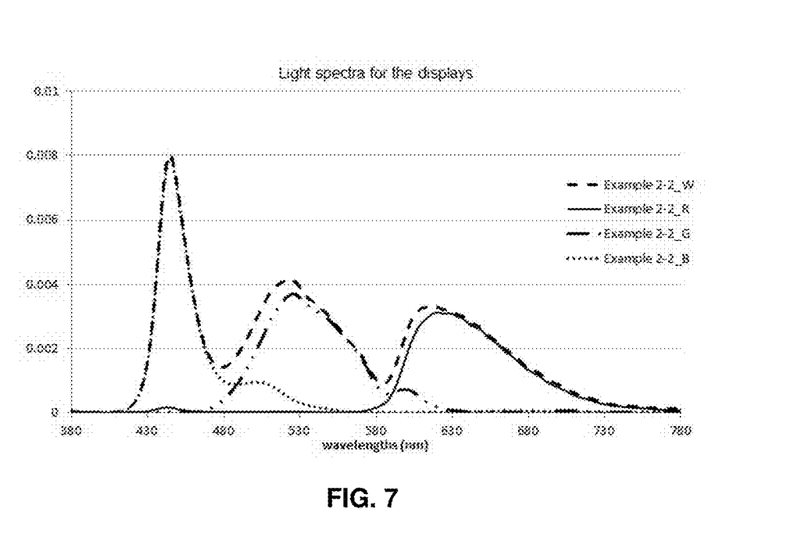
Figure 8:
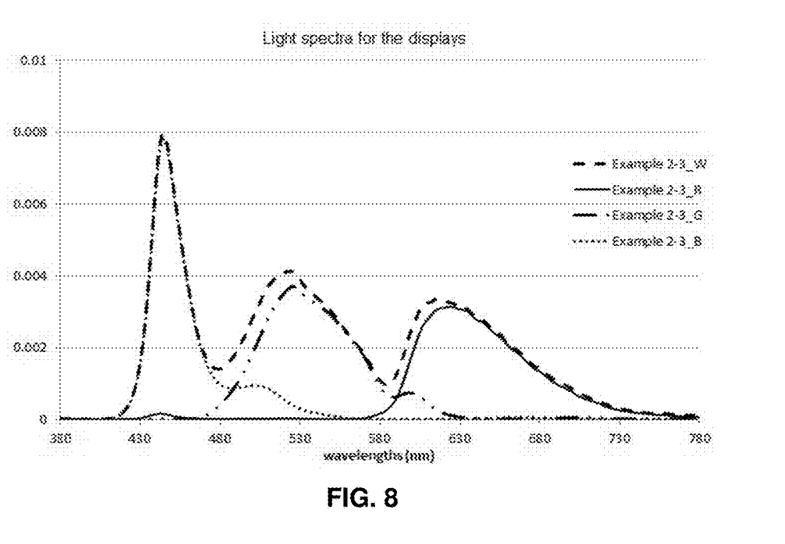
Figure 9:
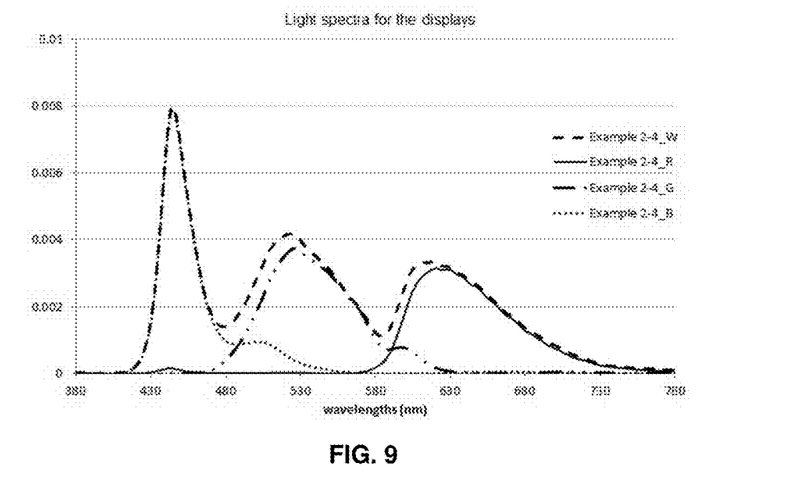
Figure 10:
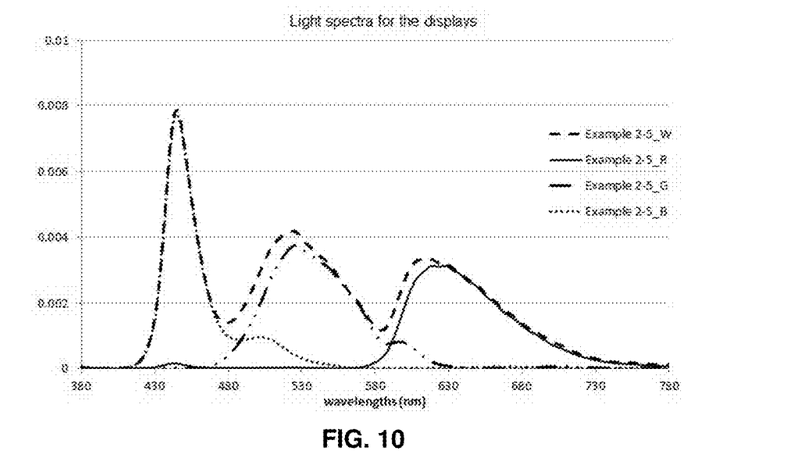
Figure 11:
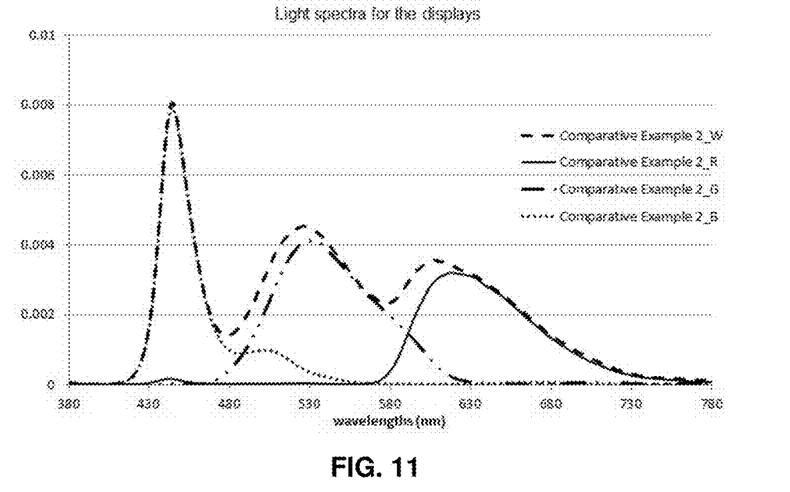
Figure 12:
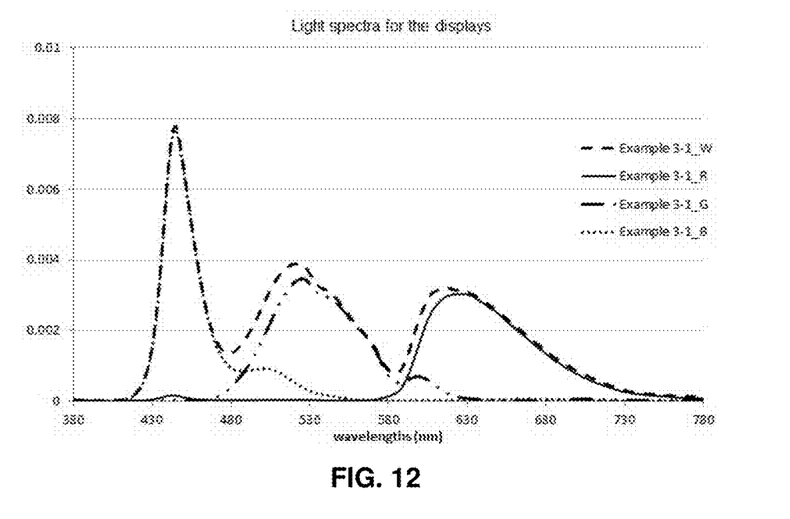
Figure 13:
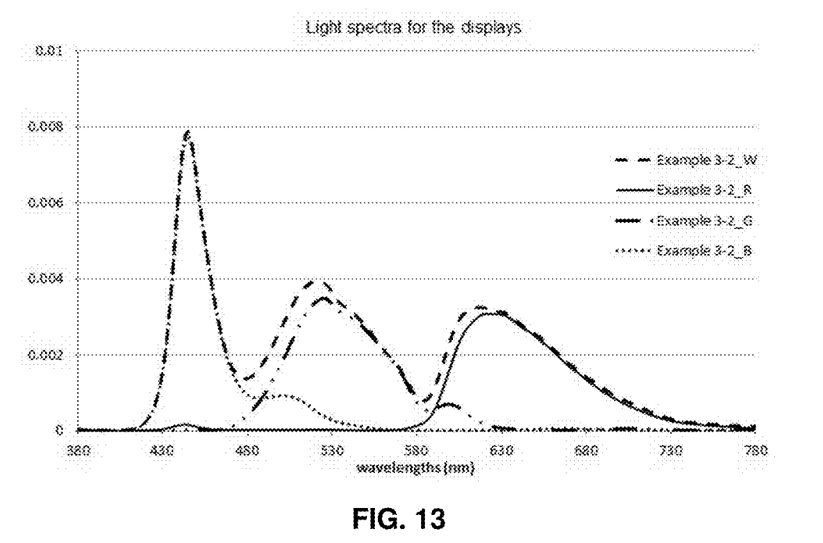
Figure 14:
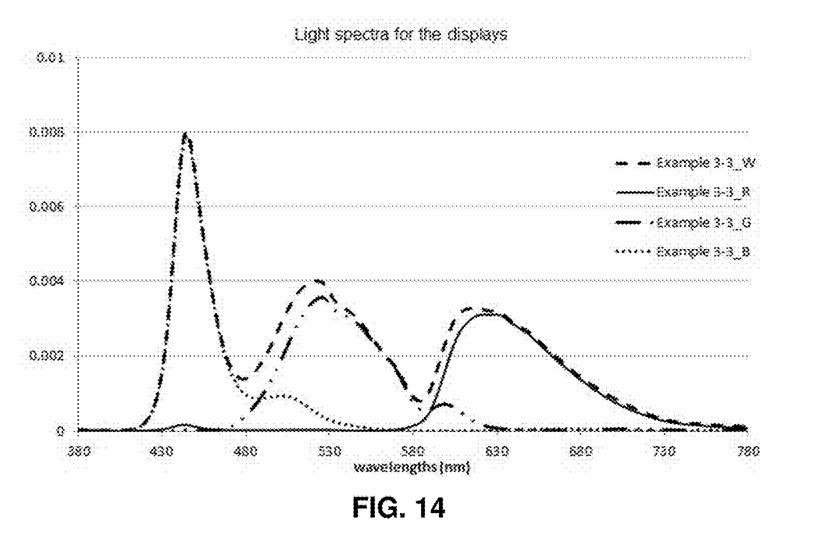
Figure 15:
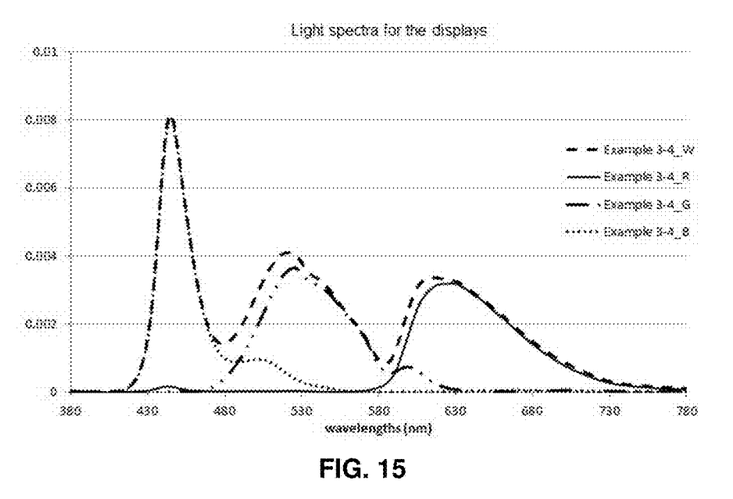
Figure 16:
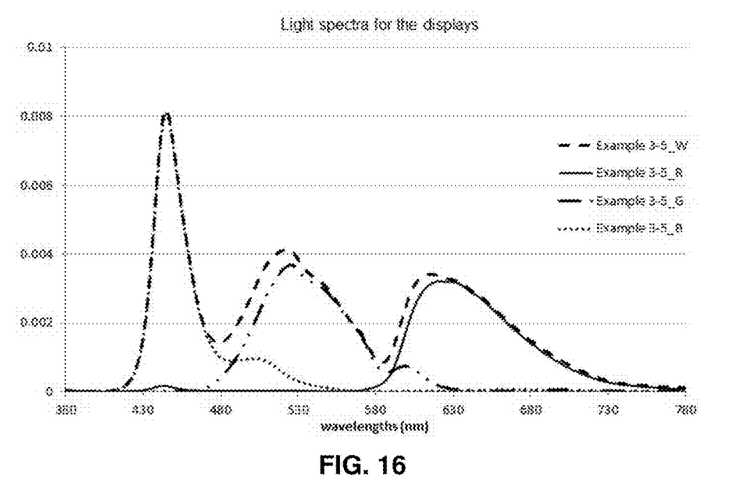
Figure 17:
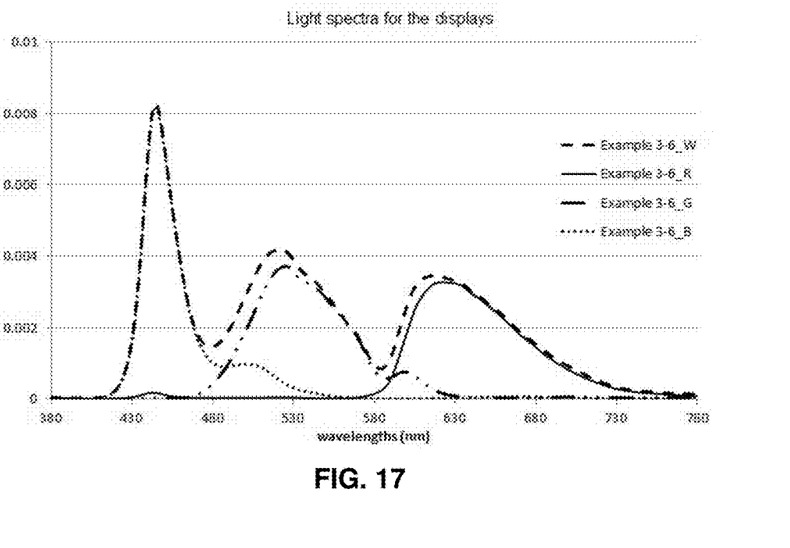

Characteristics and changes in spectrum were measured for the liquid crystal displays manufactured in Examples 1-1 and 1-2 and Comparative Example 1 by using a radiometer (CS-2000, Minolta Co., Ltd.), and the results thereof are presented in Table 1 and FIGS. 3 to 5. A color gamut indicates a color reproduction area.

TABLE 1

| | | Comparative Example 1 | Example 1-1 | Example 1-2 |
|---|---|---|---|---|
| Full W | x | 0.3091 | 0.2731 | 0.2716 |
| | y | 0.3476 | 0.3027 | 0.3020 |
| Full R | x | 0.6504 | 0.6652 | 0.6654 |
| | y | 0.3359 | 0.3171 | 0.3165 |
| Full G | x | 0.3028 | 0.2713 | 0.2709 |
| | y | 0.6439 | 0.6454 | 0.6457 |
| Full B | x | 0.1538 | 0.1510 | 0.1510 |
| | y | 0.0527 | 0.0646 | 0.0645 |

TABLE 1-continued

|  |  | Comparative Example 1 | Example 1-1 | Example 1-2 |
|---|---|---|---|---|
| Color gamut (based on CIE1931) | DCI area ratio | 79.4% | 88.2% | 88.4% |
| | DCI overlap ratio | 75.3% | 88.2% | 88.4% |
| Color gamut (based on CIE1976) | DCI area ratio | 86.4% | 91.6% | 91.9% |
| | DCI overlap ratio | 84.8% | 91.6% | 91.9% |

As illustrated in Table 1 and FIGS. 3 to 5, the liquid crystal displays of Examples 1-1 and 1-2 including the absorption dye showed an enhanced color gamut in comparison to that of Comparative Example 1 which did not include an absorption dye in the reflective polarizing film.

Examples 2-1 to 2-5

Liquid crystal displays were manufactured in the same manner as in Example 1-2 except that the amount of the absorption dye (SK-d593 SK Chemicals) used was changed as illustrated in Table 2 below.

TABLE 2

| | Amount of absorption dye added (based on 100 parts by weight of the solution, part by weight) |
|---|---|
| Example 2-1 | 0.03 |
| Example 2-2 | 0.025 |
| Example 2-3 | 0.02 |
| Example 2-4 | 0.015 |
| Example 2-5 | 0.01 |

Comparative Example 2

A liquid crystal display having the same structure as Example 2-1 was used except that an absorption dye was not added.

Experimental Example 2

Characteristics and changes in spectrum were measured for the liquid crystal displays of Examples 2-1 to 2-5 and Comparative Example 2 in the same manner as in Experimental Example 1, and the results thereof are presented in Table 3 and FIGS. 6 to 11.

TABLE 3

| | | Comparative Example 2 | Example 2-1 | Example 2-2 | Example 2-3 | Example 2-4 | Example 2-5 |
|---|---|---|---|---|---|---|---|
| Full W | Lv | 241.4 | 192.4 | 196.9 | 198.2 | 203.7 | 205 |
| | x | 0.3143 | 0.2936 | 0.2951 | 0.2965 | 0.2989 | 0.3000 |
| | y | 0.3260 | 0.2976 | 0.3004 | 0.3020 | 0.3058 | 0.3078 |
| Full R | Lv | 52.3 | 42.02 | 42.71 | 43.16 | 44.22 | 44.49 |
| | x | 0.6394 | 0.6478 | 0.6472 | 0.647 | 0.646 | 0.6456 |
| | y | 0.3293 | 0.3153 | 0.3164 | 0.3172 | 0.3189 | 0.3195 |
| Full G | Lv | 169.3 | 131.8 | 134.7 | 135.8 | 140.2 | 141.5 |
| | x | 0.3114 | 0.2785 | 0.2812 | 0.2831 | 0.2872 | 0.2882 |
| | y | 0.6217 | 0.6378 | 0.6367 | 0.6357 | 0.6338 | 0.6335 |
| Full B | Lv | 21.53 | 19.97 | 20.12 | 20.11 | 20.31 | 20.37 |
| | x | 0.1527 | 0.1521 | 0.1521 | 0.1520 | 0.1521 | 0.1521 |
| | y | 0.0684 | 0.0641 | 0.0646 | 0.0648 | 0.0655 | 0.0657 |
| Color gamut (based on CIE1931) | DCI area ratio | — | 83.1% | 82.5% | 82.1% | 81.1% | 80.8% |
| | DCI overlap ratio | — | 83.1% | 82.5% | 82.1% | 81.1% | 80.8% |

As illustrated in Table 3 and FIGS. 6 to 11, enhanced levels of color gamut were different depending on the amount of the absorption dye used. From the above result, it may be understood that brightness and color gamut characteristics of the liquid crystal display may be maximized by adjusting the amount of the used absorption dye according to BLU characteristics.

Examples 3-1 to 3-6

Liquid crystal displays were manufactured in the same manner as in Example 1-2 except that the haze of the rear bead layer was changed by adjusting the amount of the beads therein (based on 100 parts by weight of the solution) as illustrated in Table 4 below.

TABLE 4

|  | Amount of beads of rear bead layer (parts by weight) | Haze of rear bead layer |
|---|---|---|
| Example 3-1 | 1.2 | 56.6% |
| Example 3-2 | 1.0 | 46.4% |
| Example 3-3 | 0.7 | 30.4% |
| Example 3-4 | 0.5 | 22.6% |
| Example 3-5 | 0.3 | 14.4% |
| Example 3-6 | 0.1 | 5.2% |

Experimental Example 3

Characteristics and changes in spectrum were measured for the liquid crystal displays of Examples 3-1 to 3-6 and Comparative Example 2 in the same manner as in Experimental Example 1, and the results thereof are presented in Table 5 and FIGS. 12 to 17.

Figure 18:
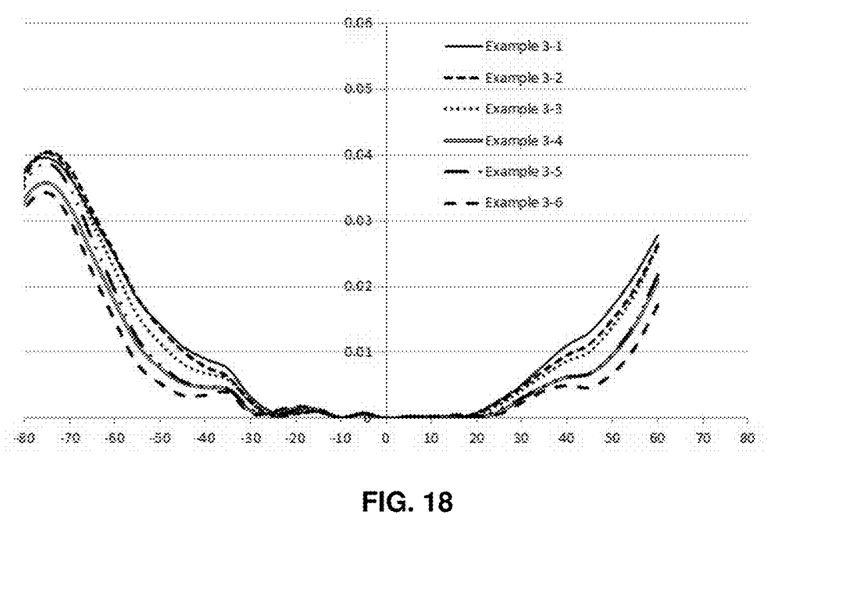
FIG. 18 is color shift measurement results of the liquid crystal displays of Examples 3-1 to 3-6 depending on left and right viewing angles.

Also, color shifts depending on left and right viewing angles were measured in the same manner, and the results thereof are presented in FIG. 18.

As illustrated in Table 5 and FIGS. 12 to 17, it may be understood that the brightness was improved while the color gamut level was maintained according to the haze level of the rear bead layer.

Also, as illustrated in FIG. 18, the color shifts depending on left and right viewing angles were different according to the haze level of the rear bead layer, and the color shifts depending on left and right viewing angles were improved as the haze of the rear bead layer was decreased (with respect to Example 3-6). From the above result, it may be understood that, in consideration of brightness loss and color shift, optimal conditions may vary depending on application.

Thus, it may be confirmed that the liquid crystal display of the present invention may improve a color gamut by transmitting pure RGB wavelengths emitted from a light source as much as possible and blocking unnecessary wavelengths other than the RGB wavelengths, and, as a result, enhancements of brightness and color gamut were maximized.

| Explanation of Mark | |
|---|---|
| 10: a liquid crystal panel | 101: an upper polarizing plate |
| 102: an adhesive layer I | 103: a liquid crystal cell |
| 104: an adhesive layer II | 105: a lower polarizing plate |
| 20: a backlight unit | 201: a reflective polarizing film |
| 202: a horizontal prism sheet | 203: a vertical prism sheet |
| 204: a diffusion sheet | 205: a light guide plate |
| 206: a reflective plate | |
| 201A and 201B: a reflective polarizing film | |
| 201A-1: a first polyester layer | 201A-2: a first adhesive layer |
| 201A-3 and 201B-3: a core layer | 201A-4: a second adhesive layer |
| 201A-5: a second polyester layer | 201A-6: a rear bead layer |
| 201B-1: a diffusion bead layer | 201B-2: a diffusion coating layer |
| 201B-4: an adhesive layer | 201B-5: a polyester layer |
| 201B-6: a rear bead layer | 202-1: a prism pattern layer |

TABLE 5

|  |  | Comparative Example 2 | Example 3-1 | Example 3-2 | Example 3-3 | Example 3-4 | Example 3-5 | Example 3-6 |
|---|---|---|---|---|---|---|---|---|
|  | Lv. | — | 100% | 102% | 103% | 106% | 107% | 108% |
| Full W | Lv | 241.4 | 183.7 | 186.6 | 189.9 | 194.7 | 195.7 | 198.8 |
|  | x | 0.3143 | 0.2945 | 0.2949 | 0.2949 | 0.2954 | 0.2958 | 0.2956 |
|  | y | 0.326 | 0.2949 | 0.2953 | 0.2955 | 0.2962 | 0.2966 | 0.2965 |
| Full R | Lv | 52.3 | 41.1 | 41.8 | 42.5 | 43.6 | 43.9 | 44.5 |
|  | x | 0.6394 | 0.6480 | 0.6481 | 0.6481 | 0.6480 | 0.6481 | 0.6483 |
|  | y | 0.3293 | 0.3153 | 0.3154 | 0.3156 | 0.3158 | 0.3159 | 0.3157 |
| Full G | Lv | 169.3 | 124.5 | 126.6 | 128.9 | 132.2 | 132.9 | 134.8 |
|  | x | 0.3114 | 0.2785 | 0.2788 | 0.2789 | 0.2795 | 0.2798 | 0.2791 |
|  | y | 0.6217 | 0.6364 | 0.6363 | 0.6363 | 0.6363 | 0.6362 | 0.6365 |
| Full B | Lv | 21.53 | 19.2 | 19.5 | 19.8 | 20.2 | 20.3 | 20.6 |
|  | x | 0.1527 | 0.1520 | 0.1520 | 0.1520 | 0.1521 | 0.1521 | 0.1520 |
|  | y | 0.0684 | 0.0637 | 0.0638 | 0.0638 | 0.0638 | 0.0639 | 0.0639 |
| Color gamut (based on CIE1931) | DCI area ratio | — | 83.0% | 82.9% | 82.9% | 82.8% | 82.8% | 83.0% |
|  | DCI overlap ratio | — | 83.0% | 82.9% | 82.9% | 82.8% | 82.8% | 83.0% |
| Color gamut (based on CIE1976) | DCI area ratio | — | 87.3% | 87.3% | 87.2% | 87.1% | 87.0% | 87.2% |
|  | DCI overlap ratio | — | 87.3% | 87.3% | 87.2% | 87.1% | 87.0% | 87.2% |

-continued

| Explanation of Mark | |
|---|---|
| 202-2: a prism sheet base material | 202-3: a rear coating layer |
| 202-4: third beads | 204-1: first beads |
| 204-2: a diffusion coating layer | 204-3: a diffusion sheet base material |
| 204-4: a concealing coating layer | 204-5: second beads |
| 206-1: fourth beads | 206-2: a front coating layer |
| 206-3: a reflective plate base material | |

What is claimed is:

1. A liquid crystal display comprising:
a backlight unit; and
a liquid crystal panel,
wherein the backlight unit sequentially comprises two or more of a reflective polarizing film, a prism sheet, a diffusion sheet, a light guide plate, and a reflective plate,
wherein the reflective polarizing film comprises an absorption dye which includes at least one of a hydroxy benzotriazole-based dye and a tetra aza porphyrin-based dye,
wherein the reflective polarizing film sequentially comprises a first polyester layer, a first adhesive layer, a core layer, a second adhesive layer, a second polyester layer, and a rear bead layer, and
wherein the reflective polarizing film has a coating layer including the absorption dye on at least one position of one side or both sides of the first polyester layer, one side or both sides of the core layer, and one side or both sides of the second polyester layer, or comprises the absorption dye in the first adhesive layer, the second adhesive layer, or both thereof.

2. A liquid crystal display comprising:
a backlight unit; and
a liquid crystal panel,
wherein the backlight unit sequentially comprises two or more of a reflective polarizing film, a prism sheet, a diffusion sheet, a light guide plate, and a reflective plate,
wherein the reflective polarizing film comprises an absorption dye which includes at least one of a hydroxy benzotriazole-based dye and a tetra aza porphyrin-based dye,
wherein the reflective polarizing film sequentially comprises a diffusion bead layer, a diffusion coating layer, a core layer, an adhesive layer, a polyester layer, and a rear bead layer, and
wherein the reflective polarizing film has a coating layer including the absorption dye on at least one position of one side or both sides of the core layer and one side or both sides of the polyester layer, or comprises the absorption dye in the diffusion coating layer, the adhesive layer, or both thereof.

3. The liquid crystal display of claim 1, wherein the core layer is a laminated film in which a first polymer layer and a second polymer layer having different refractive indices from each other are alternatingly stacked to selectively reflect and transmit a visible light having a specific wavelength.

4. The liquid crystal display of claim 2, wherein the core layer is a laminated film in which a first polymer layer and a second polymer layer having different refractive indices from each other are alternatingly stacked to selectively reflect and transmit a visible light having a specific wavelength.

5. The liquid crystal display of claim 1, wherein the absorption dye further comprises a dye absorbing a wavelength band of 480 nm to 510 nm or 560 nm to 610 nm.

6. The liquid crystal display of claim 2, wherein the absorption dye further comprises a dye absorbing a wavelength band of 480 nm to 510 nm or 560 nm to 610 nm.

7. The liquid crystal display of claim 5, wherein the dye is at least one selected from the group consisting of a cyanine-based dye, a pyrrole methine-based dye, a rhodamine-based dye, and a boron dipyrromethene-based dye.

8. The liquid crystal display of claim 6, wherein the dye is at least one selected from the group consisting of a cyanine-based dye, a pyrrole methine-based dye, a rhodamine-based dye, and a boron dipyrromethene-based dye.

9. The liquid crystal display of claim 7, wherein the absorption dye is a combination of the hydroxy benzotriazole-based dye, the cyanine-based dye, and the tetra aza porphyrin-based dye.

10. The liquid crystal display of claim 8, wherein the absorption dye is a combination of the hydroxy benzotriazole-based dye, the cyanine-based dye, and the tetra aza porphyrin-based dye.

11. The liquid crystal display of claim 1, wherein the absorption dye is included in an amount of 0.01 wt % to 10 wt % based on the total weight of the absorption dye-containing coating layer or adhesive layer.

12. The liquid crystal display of claim 2, wherein the absorption dye is included in an amount of 0.01 wt % to 10 wt % based on the total weight of the absorption dye-containing coating layer or adhesive layer.

13. The liquid crystal display of claim 1, wherein the liquid crystal panel sequentially comprises an upper polarizing plate, an adhesive layer I, a liquid crystal cell, an adhesive layer II, and a lower polarizing plate.

14. The liquid crystal display of claim 2, wherein the liquid crystal panel sequentially comprises an upper polarizing plate, an adhesive layer I, a liquid crystal cell, an adhesive layer II, and a lower polarizing plate.

* * * * *